May 12, 1970 — E. GISONDI — 3,511,127
METAL FASTENING DEVICE
Filed Feb. 5, 1969 — 2 Sheets-Sheet 1
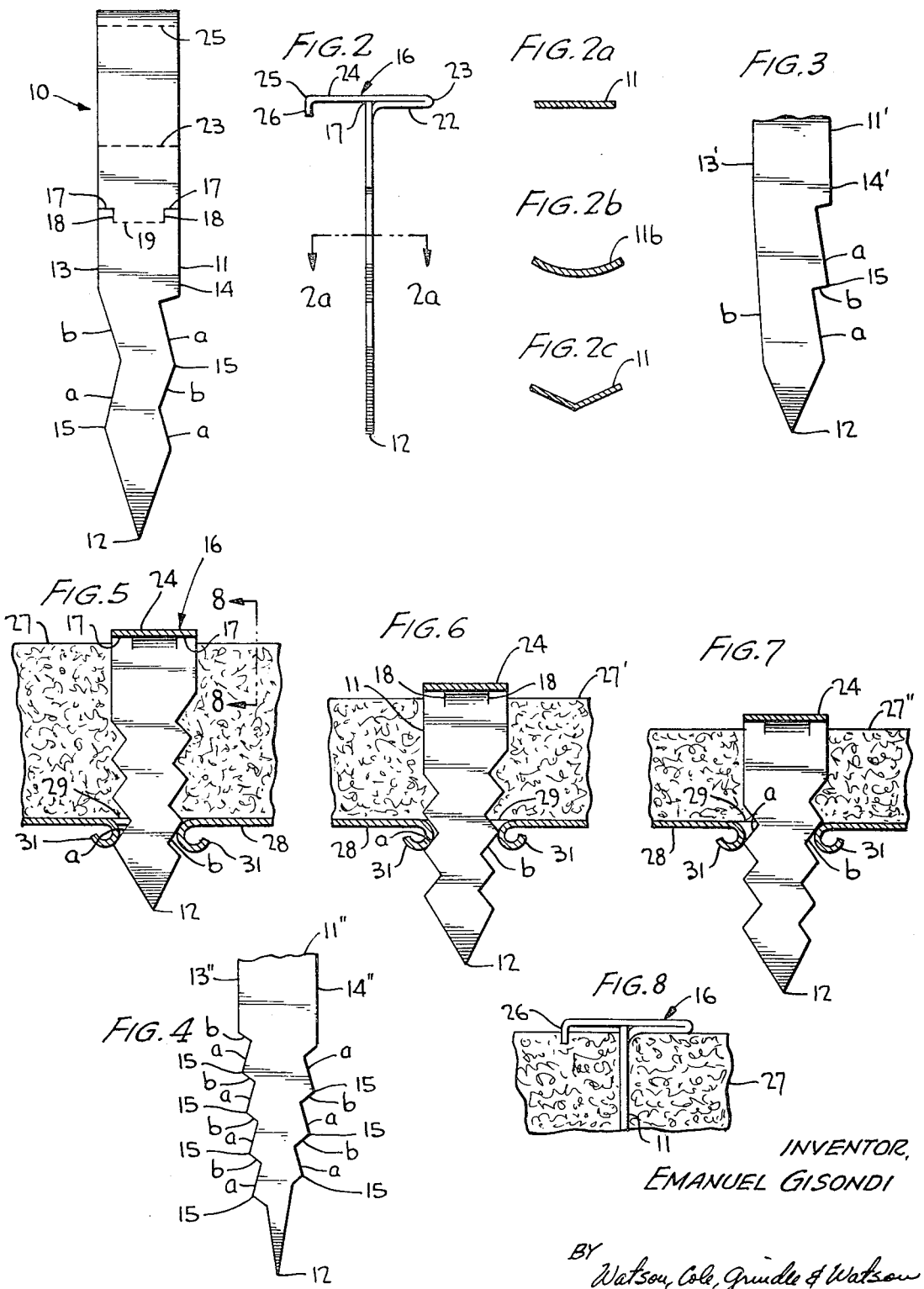
INVENTOR,
EMANUEL GISONDI
BY Watson, Cole, Grindle & Watson
ATTORNEYS May 12, 1970     E. GISONDI     3,511,127
METAL FASTENING DEVICE
Filed Feb. 3, 1969     2 Sheets-Sheet 2
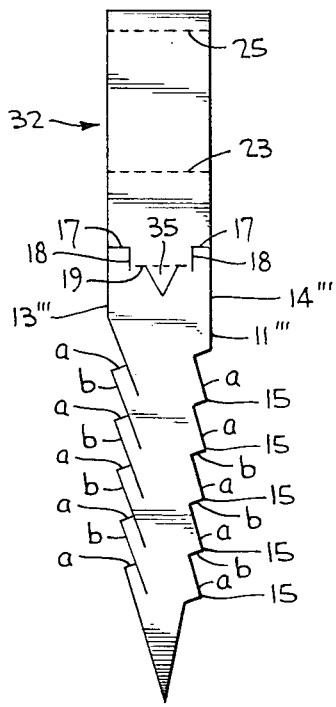
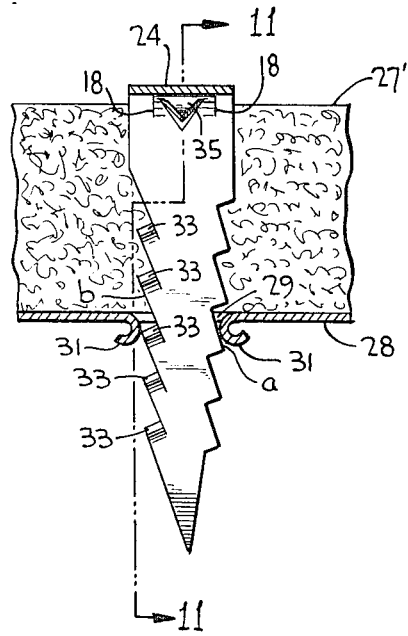
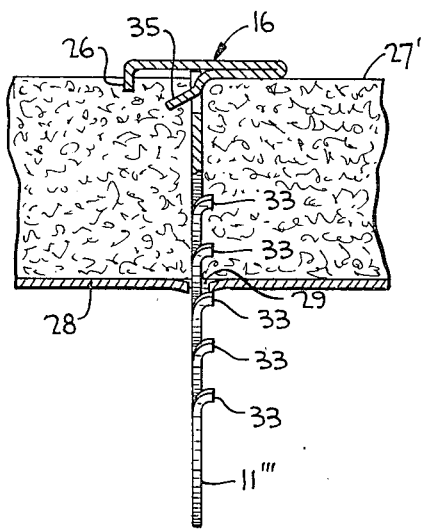
INVENTOR,
EMANUEL GISONDI
BY
Watson, Cole, Grindle & Watson
ATTORNEYS United States Patent Office 3,511,127
Patented May 12, 1970

3,511,127
METAL FASTENING DEVICE
Emanuel Gisondi, 11 Ernest Drive,
Scarsdale, N.Y. 10583
Filed Feb. 3, 1969, Ser. No. 796,006
Int. Cl. F16b 15/06
U.S. Cl. 85—11                                2 Claims

ABSTRACT OF THE DISCLOSURE

A metal fastening device made from a flat steel blank in the form of an elongated strip comprising a shank portion with metal-holding and wedging means along both marginal edges thereof, and a fastener head formed on the shank as the blank is bent back and forward on itself over the shank.

---

This invention relates generally to fastening devices and more particularly to fasteners of nail-like form adapted to be driven through roofing material, especially roofing insulation boards, for securing them to steel roof decks or similar hard materials.

During the course of building construction, it is becoming increasingly difficult to apply a layer or layers of insulation material to the surface of a steel deck or wall or other similar metal material without involving an undue amount of time and expense. Present techniques for such applications usually require, for example, the drilling of holes in the metal deck for anchoring a number of fasteners, or welding the fasteners to one side of the steel deck so that insulation material may be impaled over each fastener. Such techniques, however, increase the roofer's costly fastening time, thereby adding to the already high cost of construction. The optimum type of fastener for the purpose mentioned is one having the ability to be handled and used in the manner of an ordinary nail and which will anchor itself securely in place after being driven with an ordinary hammer. Accordingly, it is the object of the present invention to provide a fastening device for use in securing insulation sheets or other roofing materials to a metal deck or wall which fastener may be handled like an ordinary nail yet will anchor itself to the metal deck without the use of other tools.

Another object of this invention is to provide a fastening device made of a one-piece blank of hardened metal thereby rendering such a fastener easy to manufacture, economical to use, and simple to design.

A further object of the instant invention is to provide a fastener as described wherein an elongated strip is cut out from the metal blank and formed into a shank portion having a pointed end and a head end with means along opposite marginal edges thereof for wedging and holding the fastener to the deck after being pierced by the pointed end.

A still further object of the invention is to provide a fastening device of the type described wherein the head end of the fastener is formed by being bent at right angles to the shank, and bent back and forward on itself over the shank portion.

A still further object of the instant design is to provide a fastener of the character described wherein the metal-holding and wedging means lie along opposite edges of the shank so that after the deck is pierced, the holding means engages with one edge of the aperture so formed and the wedging means engages with the opposing end of the aperture for wedging the fastener therewithin.

A still further object of the invention is to provide a fastening device as described wherein the wedging and holding means extend for a sufficient distance along the edges of the shank so that insulation material of different thicknesses may be secured to the sheet metal member with the use of only a single sized fastener.

A still further object of the invention is to provide a fastener of the type described wherein the holding means comprises a plurality of surfaces sloping outwardly toward the pointed end and wherein the wedging means comprises a plurality of surfaces sloping inwardly toward the pointed end and intersecting with the outwardly sloping surfaces to form a plurality of teeth along the shank marginal edges.

A still further object of the instant design is to provide a fastener as characterized wherein the outwardly sloping surfaces forming the holding means project laterally from the plane of the shank portion thereby providing additional holding power as one of the projections engages behind the wall of the aperture formed during insertion.

Other objects, advantages and novel features of the invention will become apparent from the following detailed description of the invention when considered in conjunction with the accompanying drawings wherein:

FIG. 1 is a plan view of a sheet-metal blank from which one embodiment of the fastener according to the invention may be constructed;

FIG. 2 is a side view of the completed fastener formed from the blank of FIG. 1;

FIG. 2a is a cross-sectional view taken substantially along the line 2a—2a of FIG. 2;

FIGS. 2b and 2c are views similar to FIG. 2a but showing different cross-sectional shapes which the fastener shank portion may take;

FIGS. 3 and 4 are front views, respectively, of slightly different embodiments of the fastener shank portion;

FIGS. 5, 6 and 7 are front views of the fastener substantially the same as FIG. 1 but showing the holding and wedging feature of the shank after it has pierced a metal deck and showing its capability of securing a sheet of insulation of different thicknesses to a sheet metal deck;

FIG. 8 is a view taken at line 8—8 of FIG. 5 showing the head end of the fastener in its relation to the insulation sheet;

FIG. 9 is a plan view of another sheet-metal blank from which still another embodiment of the fastener according to the invention may be constructed;

FIG. 10 is a front view of the fastener formed from the blank of FIG. 9 and showing an insulation sheet secured to a metal deck after having been pierced by the fastener shank portion; and FIG. 11 is a sectional view taken substantially along the line 11—11 of FIG. 10.

Turning now to the drawings wherein like reference characters refer to like and corresponding parts throughout several views, there is shown in FIG. 1 a blank 10 which may be sheet metal stamped out in the form of an elongated strip. The blank is made of carbon steel, heated and double tempered to withstand hammer blows and to facilitate piercing a steel roof deck or wall. As can be seen, the blank is formed into a nail-like fastener having a shank portion 11 terminating in a pointed end 12 for piercing and having, along opposite marginal edges 13, 14, a series of teeth or jagged surfaces 15 formed for engagement with the pierced aperture of the deck thereby enabling the fastener to be securely held in place. Along both marginal edges, teeth 15 are formed of a number of downwardly and outwardly sloping surfaces $a$ intersecting with a number of downwardly and inwardly sloping surfaces $b$ thereby acting as a wedge means for the holding means or surfaces $a$ in a manner to be later explained.

The blank 10 is slitted as at 17, 18 inwardly from marginal edges 13, 14 so as to enable formation of head end 16 made by first bending the topmost portion of the blank 90° along a fold line 19 which extends between slits 18, 18. In this way the portions of shank 11 between slits 18 and their respective marginal edges 13, 14 remain in the plane of shank portion 11 after the blank is first bent, as clearly shown in FIG. 2 of the drawings. Thereafter, the blank is reversely bent on itself along the fold line 23 resulting in a portion 22 extending to one side of the shank 11 between fold lines 19 and 23, and a portion 24 extending toward the opposite side of the shank between fold line 23 and the free end of the blank. Finally the portion 24 of the blank is bent along the fold line 25 forming a downwardly extending flange 26.

In FIGS. 2a, 2b, and 2c of the drawings, it can be seen that the cross-sectional shape of shank 11 is rectangular as shown in FIG. 2a, but may be formed arcuate in cross-section as at 11b in FIG. 2b or, V-shaped in cross-section as at 11c in FIG. 2c if desired. The different shapes shown in FIGS. 2b and 2c are intended to illustrate that the shank portion 11 of FIG. 2 may take on different cross-sectional shapes depending on, for example, whether it becomes necessary to further strengthen the fastening device.

Turning now to FIG. 3 of the drawings, a shank portion 11' is shown which illustrates a different embodiment for the shank 11. Here, holding surfaces a and wedging surfaces b are provided along marginal edge 14' whereas only wedging surface b is formed along the marginal edge 13'. Otherwise, these holding and wedging surfaces perform in the same manner as those in FIG. 1. However, the wedging surfaces b are of a different length along their marginal edges 13', 14' as compared to the length of surfaces b shown in FIG. 1.

In the embodiment of FIG. 4, the shank portion 11" differs from the other aforedescribed embodiments mainly by the fact that it is provided with a slightly sharper pointed end 12 and that the length of surfaces b is not the same as shown in the embodiments of FIGS. 1 and 3. In addition, the shank portion 11" is formed with a larger number of teeth 15 along its marginal edges 13", 14".

In FIG. 5, it will be seen that a fastening device, similar to the aforedescribed embodiment of FIG. 1 is capable of securing a sheet of insulation 27, of different thickness as shown by 27', 27" in FIGS. 6 and 7, respectively, to a sheet metal surface or deck 28 using, in each case, the same size fastener. For example, when the fastener is hammered through the insulation sheet 27 and pierces the metal deck 28 thereby producing a pierced aperture 29, the curls 31 of displaced steel under the metal sheet 28 form shoulders creating additional holding power for the holding means or surface a along the shank of the fastener. At the same time, the surface b engages the other curl 31 keeping the side of the teeth a firmly against the other curl 31. The surface b, therefore, acts as a wedging means for the fastener while the surface a prevents any upward movement or loosening of the fastener after it has pierced through the sheet metal deck 28. Of course, the curls 31 act to slightly close the opposite ends of the slot 29 after being so formed by the pointed end 12 of the shaft. Accordingly, the resilience of curls 31 enhance the holding and wedging power of the teeth 15 along each side of the shank marginal edges. It should be noted that in each of the FIGS. 5, 6 and 7, the head end 16 of the fastener is shown in cross-section at the portion 24 of the shank for purposes of clarity. Therefore, it can be clearly seen that portion 24 rests directly on the edges formed by slits 17 (see also FIG. 2) so that the pounding forces from an ordinary hammer used to drive the fastener in place are thereby transmitted directly to the shank portion 11. Insertion of the shank 11 through the deck 28 is limited by the head end 16 as it is driven into contact with the top of insulation board 27, as clearly shown in FIG. 8. Upon such contact, the flange 26 embeds itself slightly into the board's top surface thereby preventing any shifting of the insulation while secured to the deck. In FIGS. 6 and 7 of the drawings, it is seen that the different thicknesses of insulation sheets 27', 27" present no problem in an attempt to secure them firmly in place even with the use of the same size fastening device because the teeth 15 are formed along opposite marginal edges of the shank between the pointed end 12 and head end 16 for substantially the entire length of the shank 11. In this way, the fastening device may be driven through the sheet metal deck 28 until the rim 26 partially embeds itself in the top surface of the insulation sheet. Depending on the thickness of the insulation sheet, one of the surfaces a is always made to engage behind one edge of the slot 29 with one of the curls 31. The opposing surface b on the opposite edge of the shank portion will accordingly act to wedge and maintain the surface a in engagement with its adjacent curl 31.

Turning now to FIG. 9 of the drawings, there is shown another blank 32 from which a still further embodiment of the fastener may be made. Blank 32 is similar in all respects to blank 10 of FIG. 1 except that the holding and wedging surfaces a and b, respectively, along marginal edge 14''' are slightly shorter in length thereby forming a plurality of teeth 15 which are slightly more jagged, as in the FIG. 4 embodiment.

Another feature of the blank 32 embodiment which, most importantly, differentiates this fastener over any of the above-described embodiments resides in the provision of additional holding means for the shank 11''' in the form of prongs 33. These prongs are formed along marginal edge 13''' by extending the inwardly sloping surfaces b beyond their respective intersections with the outwardly sloping surfaces a thereby forming slits 34, as clearly shown in FIG. 9. Accordingly, those portions of the shank defined by surfaces a and b and slits 34 are bent out of the plane of shank 11''' so as to form prongs 33, as shown in FIG. 11. In this figure, as well as in FIG. 10, it can be seen that a sheet of insulation 27' is firmly held in place by the additional holding means or prongs 33.

After insertion through insulation sheet 27', the fastener is made to pierce an aperture 29 in deck 28, in the same manner as described with reference to FIGS. 5, 6 and 7. By reason of prongs 33, however, the fastener may be locked in place as one of the prongs 33 engages behind the deck 28 after passing through aperture 29 (see FIG. 11). Accordingly, holding power is not only obtained in a manner as described with reference to FIGS. 5, 6 and 7, but an additional means for locking the fastener in place is conveniently provided. For example, wedging surface b lying against its adjacent curl 31 will serve to maintain holding surface a against its adjacent curl 31 (see FIG. 10), in substantially the same way as described hereinabove for the blank 10 embodiment. In addition, engagement of one of the prongs 33 behind deck 28 (see FIG. 11) serves to firmly lock the fastener in place regardless of any expansion, contraction or other occurrences during building settlement.

Blank 32 also differs in its construction from blank 10 in the vicinity of hinge line 19 wherein a tab 35 is formed by a V-shaped slit terminating at the hinge line 19 substantially as shown in FIG. 9 of the drawings. In this way, tab 35 is moved out of the plane of shank portion 11''' when the portion 22 is first bent at line 19 to form head end 16. In FIG. 11, it can be seen that tab 35 may conveniently serve to stabilize the insulation sheet 27', in addition to flange 26, after the fastener is driven in place.

From the above-described embodiments, it can be seen that the sloping surfaces a and b comprising the teeth 15 can be designed to any suitable length. The only requirement for the design is that surfaces a and b be oriented opposite one another along opposing marginal edges of the shank portions 11 so that the holding means along one marginal edge will coact with a wedging means along the opposing marginal edge to hold the fastener securely in place.

From the foregoing, it can be seen that a fastening device has been devised which is capable of being driven in place with a hammer like an ordinary nail except that the fastener has a sharp point for easily penetrating a steel sheet when it is desirable to secure an insulation sheet or other like object thereto. Without the use of special tools, this nail-like fastening device speedily penetrates the steel sheet after which its teeth securely hold the fastener in place by engaging under the steel sheet with the curls formed during piercing. The wedging and holding type surfaces of the teeth avoid any loosening of the insulation material due to expansion and contraction of the roof or due to building settlement. One side of this versatile fastener can secure many different thicknesses of roof insulation board, developing strong holding power at any point of the teeth area. The fastener, which may be of flat steel, is provided with a very sharp point and a strong shank and is formed with a flat head for holding the applied insulation boards with the firmness necessary for a dependable roofing base. Where desired, such a flat head fastener can provide for spot welding of an additional metal sheet over the insulation board. Furthermore, the fastener shown in FIGS. 9, 10 and 11 is capable of being firmly locked in place by means of a positive engagement between one of the prongs 33 and the underside of deck 28 along the longer side of aperture 29.

It should be recognized that the fastening device can be provided with a greater or a fewer number of teeth necessary to secure as many thicknesses as desired. Also, the type of object to be secured in place over a sheet metal deck or wall is not limited to insulation board. In addition, it may be necessary to vary the design of the teeth and/or length of the shank portion for different types of construction without departing from the spirit of the invention so long as the wedging surface along one marginal edge is directly opposite a corresponding holding surface on the opposite marginal edge of the shank.

Obviously, many modifications and variations of the present invention are possible in the light of the above teachings. It is therefore to be understood that within the scope of the appended claims the invention may be practiced otherwise than as specifically described.

I claim:
1. A metal fastening device comprising a sheet metal blank forming a shank portion having opposite marginal edges, said shank portion having a pointed end and a head end, said head end formed by being bent at right angles to said shank and bent back and forward on itself, both metal-holding and wedging means formed along said shank portion at each of said marginal edges whereby objects of different thicknesses may be secured to sheet metal member as said pointed end pierces both the object and the sheet metal, metal-locking means provided along one of said marginal edges for locking the device firmly in place, said metal-holding means along each of said marginal edges of said shank maintaining said device firmly in place against one edge of the aperture formed in the sheet metal, while said metal wedging means along each of said marginal edges of said shank contacts the opposite edge of the aperture formed in the sheet metal and prevents withdrawal of said device from the sheet metal, each said metal holding means comprising a plurality of surfaces sloping outwardly toward said pointed end and each said metal wedging means comprising a plurality of surfaces sloping inwardly toward said pointed end, alternate ones of said outwardly and said inwardly sloping surfaces intersecting to form a plurality of teeth along each of said marginal edges, and the outer ends of said teeth on one of said marginal edges substantially opposing the inner ends of said teeth on the other of said marginal edges.

2. The fastening device according to claim 1 wherein said inwardly sloping surfaces on said one of said marginal edges are extended beyond the point of intersection with said outwardly sloping surfaces so as to form a plurality of slits at said inner ends of said teeth, said metal-locking means comprising a plurality of prongs bent out of the plane of said shank portion along each of said slits whereby one of said prongs may engage behind the sheet metal after being pierced by said pointed end.

References Cited

UNITED STATES PATENTS

| 156,061 | 10/1874 | Marshall | 85—11 |
| 412,981 | 10/1889 | Sanford | 85—11 |
| 500,844 | 7/1893 | Beazell | 85—10 |
| 1,352,573 | 9/1920 | Balfour | 85—21 |
| 1,410,210 | 3/1922 | Merkel et al. | 85—11 X |

FOREIGN PATENTS

| 624,746 | 6/1949 | Great Britain. |
| 663,157 | 12/1951 | Great Britain. |
| 682,577 | 11/1952 | Great Britain. |

RAMON S. BRITTS, Primary Examiner

U.S. Cl. X.R.

52—362